United States Patent
Robelin et al.

(10) Patent No.: US 9,268,759 B2
(45) Date of Patent: *Feb. 23, 2016

(54) RECOMMENDATION ENGINE FOR INTERACTIVE SEARCH FORMS

(71) Applicant: Amadeus S.A.S., Sophia Antipolis (FR)

(72) Inventors: Charles-Antoine Robelin, Antibes (FR); Benjamin Benzine, Antibes (FR); Ingolf Tobias Rothe, Koettwitzsch (DE)

(73) Assignee: Amadeus S.A.S., Biot (FR)

( * ) Notice: Subject to any disclaimer, the term of this patent is extended or adjusted under 35 U.S.C. 154(b) by 335 days.

This patent is subject to a terminal disclaimer.

(21) Appl. No.: 13/716,864

(22) Filed: Dec. 17, 2012

(65) Prior Publication Data

US 2014/0173404 A1   Jun. 19, 2014

(51) Int. Cl.
G06F 17/24   (2006.01)

(52) U.S. Cl.
CPC .................................. G06F 17/243 (2013.01)

(58) Field of Classification Search
None
See application file for complete search history.

(56) References Cited

U.S. PATENT DOCUMENTS

| | | | |
|---|---|---|---|
| 7,660,779 B2 | 2/2010 | Goodman et al. | |
| 7,890,442 B2 | 2/2011 | Weir et al. | |
| 2003/0177045 A1* | 9/2003 | Fitzgerald et al. | 705/6 |
| 2008/0120257 A1 | 5/2008 | Goyal et al. | |
| 2008/0154824 A1* | 6/2008 | Weir et al. | 706/45 |
| 2009/0043741 A1 | 2/2009 | Kim | |
| 2010/0122164 A1 | 5/2010 | Kay et al. | |
| 2012/0036158 A1 | 2/2012 | Cahill et al. | |
| 2014/0173408 A1 | 6/2014 | Canaud et al. | |

FOREIGN PATENT DOCUMENTS

| | | |
|---|---|---|
| EP | 2224358 A1 | 9/2010 |
| WO | 0180177 A2 | 10/2001 |

OTHER PUBLICATIONS

European Patent Office, Search Report issued in European Application No. 12290442.8 dated Apr. 26, 2013.
European Patent Office, International Search Report and Written Opinion issued in International Application No. PCT/EP2013/003758 dated Jan. 20, 2014.
Ali, et al., "Predictive Models of Form Filling", Microsoft TechReport No. MSR-TR-2009-1. (Jan. 2009).
Ruzkio, et al., "Automatic Form Filling on Mobile Devices", Journal Pervasive and Mobile Computing vol. 4 Issue 2, Apr. 2008, pp. 161-181, Elsevier Science Publishers B. V. Amsterdam, The Netherlands.
USPTO, Office Action issued in U.S. Appl. No. 13/716,882 dated Mar. 2, 2015.
U.S. Patent and Trademark Office, Notice of Allowance issued in related U.S. Appl. No. 13/716,882 dated Oct. 6, 2015, 9 pages.

* cited by examiner

Primary Examiner — Scott Baderman
Assistant Examiner — Asher Kells
(74) Attorney, Agent, or Firm — Thompson Hine LLP

(57) ABSTRACT

Systems, methods, and computer program products for interacting with an interactive form. A plurality of values for a plurality of controls of an interactive form are received at a server. The server determines a plurality of recommendation rules based upon the values for interrelated controls. Each value comprises a portion of a travel-related search query entered into one control of the interactive form by each of a plurality of users. Each recommendation rule logically connects two or more of the interrelated controls.

18 Claims, 4 Drawing Sheets

RECOMMENDATION ENGINE FOR INTERACTIVE SEARCH FORMS

BACKGROUND

The present invention relates to computers and computer software and, more specifically, to systems, methods, and computer program products for providing recommendations in an interactive travel-related search form.

Computer reservations systems are used to store and retrieve information and to conduct transactions related to air travel. A computer reservation system may be used for making the reservations of a particular airline. Alternatively, a computer reservation system may comprise a global distribution system that supports travel agencies and other distribution channels in making reservations for multiple airlines in a unified system. Passenger travel may be booked using the computer reservation system.

As a prerequisite to making a reservation, a prospective traveler or a travel agent may submit a travel search query to a server of the computer reservation system using an online application on a client device. The most common mechanism for submitting a travel search query requires a user to enter values into the controls of a form residing on the client device. The data may include search terms such as origin and destinations for a trip, departure and return dates for the trip, etc. A conventional approach for submitting the travel search query is to enter search terms as values into the controls of the form. The entered data is transmitted to a server of the computer reservation system, which performs a search based upon the entered data and returns matching itineraries to the client device for presentation to the user.

Improved systems, methods, and computer program products are needed to assist the user of an interactive travel search form when entering a travel-related search query.

SUMMARY

According to an embodiment of the present invention, a method is provided for interacting with an interactive form. The method may include receiving at a server a value of a first control of an interactive form, and determining with the server at least one recommended value for a second control of the interactive form different from the first control of the interactive form. The method may further include communicating the at least one recommended value for the second control of the interactive form from the server to a client device. The received value may represent a portion of a travel-related search query entered at the client device into the interactive form. The method may be embodied in a computer program product.

According to another embodiment of the present invention, a method is provided for interacting at a client device with an interactive form. The method receiving at the client device a value input into a first control of the interactive form and, in response to receipt of the value of the first control, retrieving from a local cache at the client device at least one recommended value for a second control of the interactive form that is different from the first control. The method further includes displaying the at least one recommended value for the second control in the interactive form at the client device. The value may represent a portion of a travel-related search query entered at the client device into the interactive form. The method may be embodied in a computer program product.

According to another embodiment of the present invention, a method is provided that receives at a server a plurality of values for a plurality of controls of an interactive form, and determines with the server a plurality of recommendation rules based upon the values for interrelated controls. Each value comprises a portion of a travel-related search query entered into one control of the interactive form by each of a plurality of users. Each recommendation rule logically connects two or more of the interrelated controls. The method may be embodied in a computer program product.

According to another embodiment of the present invention, an apparatus is provided for use with a client device. The apparatus comprises a server including a processor and program code configured to be executed by the processor to interact with an interactive form. The program code is configured to cause the processor to receive a value for a first control of the interactive form, determine at least one recommended value for a second control of the interactive form different from the first control, and communicate the at least one recommended value for the second control from the server to the client device. The value represents a portion of the travel-related search query entered into the interactive form.

According to another embodiment of the present invention, an apparatus comprises a client device including at least one processor and a local cache. The apparatus further comprises program code configured to be executed by the processor to interact with an interactive form. The program code is configured to cause the processor to receive a value for a first control of the interactive form, retrieve from the local cache at the client device at least one recommended value for a second control of the interactive form that is different from the first control in response to receipt of the value of the first control input into the interactive form, and display the at least one recommended value for the second control in the interactive form at the client device. The value represents a portion of the travel-related search query entered into the interactive form.

According to another embodiment of the present invention, an apparatus comprises a server including processor and program code configured to be executed by the processor to interact with an interactive form. The program code is configured to cause the processor to receive a plurality of values for a plurality of controls of the interactive form, and determine a plurality of recommendation rules based upon the values for interrelated controls. Each value represents a portion of the travel-related search query entered into one of the controls of the interactive form by a plurality of users. Each recommendation rule logically connects two or more of the interrelated controls.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
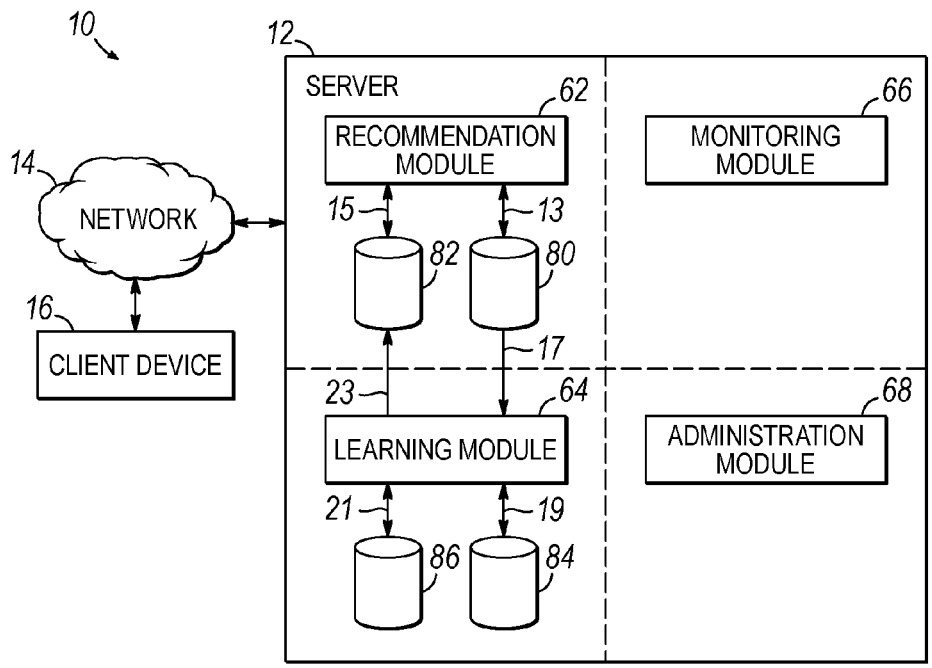
FIG. 1 is a block diagram of a computer reservation system that includes a server and a client device in communication with the server in accordance with embodiments of the invention.

With reference to FIG. 1, computerized reservation system (CRS) 10 includes a server 12 and a client device 16 that is coupled in communication over a communication network 14 with the server 12. The CRS 10 may be used to store and retrieve information and conduct on-line transactions related to goods and services, such as the online search, booking, and purchase of tickets for air travel. In the context of air travel, the CRS 10 is configured to respond to travel search queries by identifying particular flights that satisfy a given itinerary, and to make or book reservations for those flights. The CRS may be a proprietary computer system allowing real-time access to airlines fares, schedules, and seating availability and other data, and may be accessed by travel vendors, such as travel agencies, online travel vendors, and travel companies, to make bookings. The CRS 10 may be embodied in a global distribution system (GDS), which is a type of CRS that books and sells air travel tickets for multiple airlines, as well as other related travel items such as hotels, rental cars, etc.

The server 12, which is remote from the client device 16, may generally comprise one or more interconnected computing devices/systems located locally and/or remotely and configured to perform one or more operations associated with the server 12. Communication network 14 generally comprises one or more interconnected communication networks, including for example, a local area network (LAN), a wide area network (WAN), a public network (e.g., the Internet using an Internet Service Provider), an enterprise private network, a cellular network, and/or combinations thereof. The interface connecting the server 12 and client device 16 may employ one or more suitable communication protocols defining rules and data formats for exchanging information and communicating over the network 14, such as User Datagram Protocol/Internet Protocol (UDP/IP), and/or Transmission Control Protocol/Internet Protocol (TCP/IP).

Figure 3:
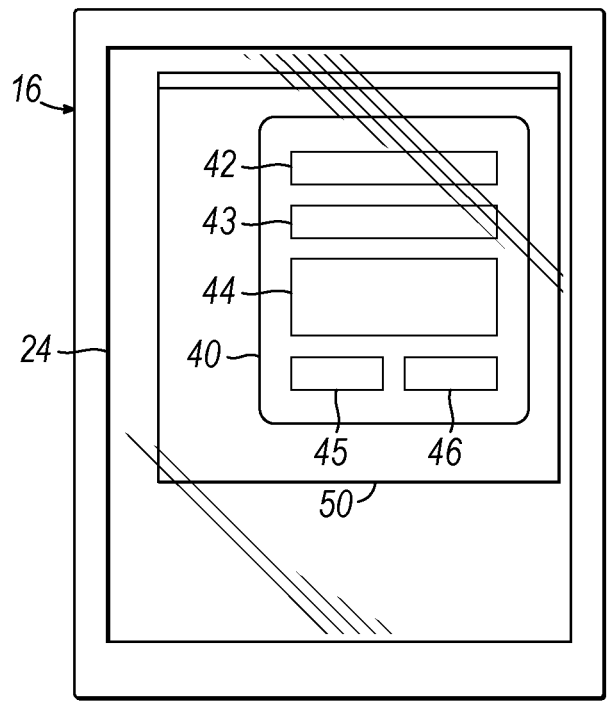
FIG. 3 is a diagrammatic view of the interactive form residing on the client device.

During a given session, a user of the client device 16 may be in communication over the communications network 14 with the server 12 for the representative purpose of planning an itinerary for a trip. However, while a single client device 16 is depicted in FIG. 1, it is understood that multiple different users may communicate with the server for the same purpose using different client devices 16. The multiple different users constitute a pool of users that communicate with the server 12 for the purpose of making travel search queries by entering information into the fields or controls of the same interactive form 40 (FIG. 3).

In brief, values entered by a user into fields or controls of the interactive form 40 at the client device 16 are communicated over the network 14 to the server 12. A recommendation module 62 at the server 12 stores the received control values in a history database 80 and may retrieve the stored values from the history database 80, as indicated by the double headed arrow 13. The stored values may be associated with a particular user in a record of the history database 80 so as to establish user preferences and a user history. The recommendation module 62 at the server 12 queries a recommendation rules database 64 to access a set of recommendation rules stored in the recommendation rules database 64 to logically generate suggestions in the form of recommendations for controls of the interactive form 40. The retrieved recommendation rules match the query and reflect interrelated controls in the interactive form 40 for which recommendation rules have been established. The query of the recommendation rules database 82 is represented by the double-headed arrow 15 in FIG. 1. The recommendations represent predicted control values of comparatively high probability and may serve to relieve the user of the interactive form 40 from being required to select values for one or more controls of the interactive form 40 necessary to generate, for example, a trip booking query. Recommendations are communicated from the server 12 to the client device 16 and used by the client device 16 to adapt the interactive form 40. The recommendation process may be synchronous with the user entry of control values and the continuous data flow from the client device 16. A monitoring module 66 functions as described below in conjunction with the operation of the recommendation module 62 to monitor the received control values.

A learning module 64 queries the history database 80 to retrieve stored values of historical user entries for the controls of the interactive form 40, as indicated by the arrow 17. The learning module 64 uses an algorithm to compute recommendation rules for interrelated controls of the interactive form 40. The learning module 64 may access predefined business rules stored in a business rules database 84 as indicated by double-headed arrow 19 and/or static parameters stored in a parameters database 86 as indicated by double-headed arrow 21. The learning module 64 is configured to manipulate the content of the recommendation rules database 82 by inserting new recommendation rules and updating or deleting existing recommendation rules, as indicated by arrow 23. Each recommendation rule computed by the learning module 64 interrelates different controls that are logically capable of being interrelated.

Figure 2:
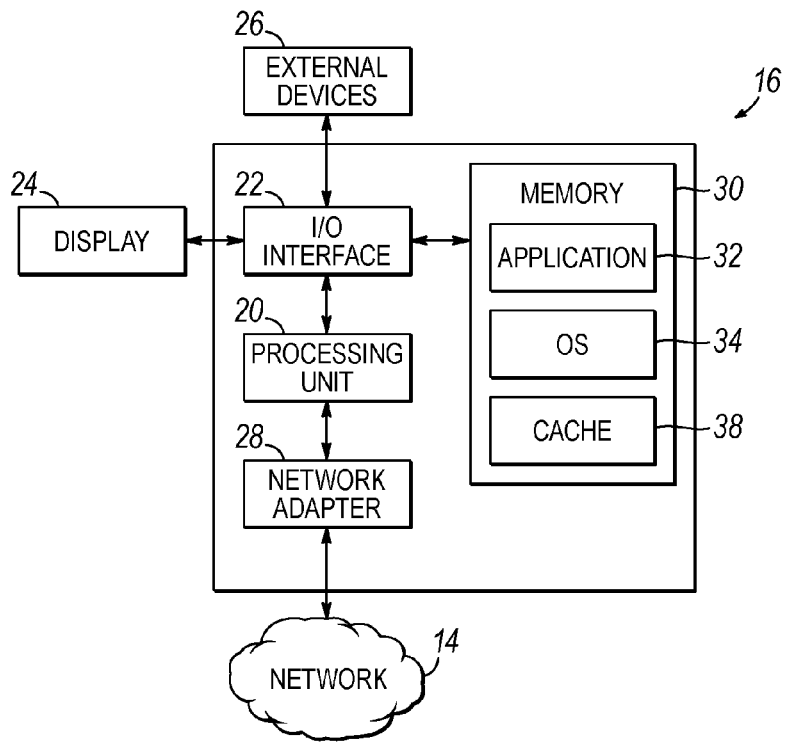
FIG. 2 is a block diagram of the client device of FIG. 1.

With reference to FIG. 2 in which like reference numerals refer to like features in FIG. 1, the client device 16 includes one or more processing units 20 configured to execute one or more instructions to perform and/or cause components of the client device 16 to perform one or more operations consistent with embodiments of the invention. The client device 16 may be any type of electronic device, such as a mobile telephone, a smartphone, a tablet computer, a personal digital assistant (PDA), a desktop computer, a laptop computer, a notebook computer, etc., typically used to interact with an interactive form 40 to perform a travel-related search query.

The client device 16 includes an input/output ("I/O") interface 22, a display 24, and external devices 26. The I/O interface 22 of client device 16 may be configured to receive data from the display 24 and data from the external devices 26 that is communicated to the processing unit 20 and may be configured to output data from the processing unit 20 to the display 24 and external devices 26. The display may be, for example, a computer monitor or a screen on a mobile phone or a tablet. Alternatively, the display 24 may be a touch screen that not only functions to permit a user to receive and view output data, but also functions to permit the user to input data with, for example, an onscreen virtual keyboard. The external devices 26 may include, for example, additional user input devices such as a keyboard, a keypad, a mouse, a microphone, etc., and additional user output devices such as speakers, etc. The client device 16 may also include a network adapter 28, such as a network interface card or a transceiver, that supplies the physical connection with the network 14 and that is configured to transmit data to the server 12 and receive data from the server 12 over the network 14. In one embodiment, the client device 16 may communicate with the network 14 under an agreement with a mobile service provider as known in the art.

A memory 30 of the client device 16 is configured to store a software module or application 32 and/or an operating system 34, where the client application 32 and operating system 34 each generally comprise one or more instructions stored as program code that may be read from the memory 30 by each processing unit 20. The instructions, when executed by the processing unit 20, may cause each processing unit 20 to perform one or more operations to thereby perform the steps necessary to execute steps, elements, and/or blocks embodying the various embodiments of the invention.

The memory 30 may represent random access memory (RAM) comprising the main storage of a computer, as well as any supplemental levels of memory, e.g., cache memories, non-volatile or backup memories (e.g., programmable or flash memories), mass storage memory, read-only memories (ROM), etc. In addition, the memory 30 may be considered to include memory storage physically located elsewhere, e.g., cache memory in a processor of any computing system in communication with the client device 16, as well as any storage device on any computing system in communication with the client device 16 (e.g., a remote storage database, a memory device of a remote computing device, cloud storage, etc.).

The client application 32 in the memory 30 runs locally on the client device 16 and its program code may comprise instructions that, when executed by each processing unit 20, facilitates the creation and operation of an interactive form 40 (FIG. 3). The interactive form 40 provides an interface between a user of the client device 16 and the server 12 that is located at a remote location from client device 16. Accordingly, a user may interact with an interactive form 40 (FIG. 3) displayed on the display 24.

The client application 32 may display the interactive form 40 to the user on display 24 at the client device 16. The interactive form 40 may be displayed in a graphical user interface in which the information and actions for form 40 are available to the user of the client device 16 through graphical icons and visual indicators. For example, the interactive form 40 may be displayed as a web page on a browser 50 (FIG. 3), which may be constituted by a software application associated with the operating system 34 and that provides web browsing functionality. The browser 50 may comprise a mobile browser specifically designed for use on a mobile device, such as a mobile phone or a tablet. A markup language, such as HyperText Markup Language (HTML), creates the interactive form 40 for display in the browser 50. For example, the markup language can embed scripts from a scripting language that affect the behavior of the interactive form 40. Alternatively, the client application 32 may also comprise a mobile application (i.e., a mobile app) designed to run on a smartphone, a tablet computer, or other mobile device and that is downloaded from an application distribution platform, such as a network-accessible location (e.g., a mobile application store or an accessible database), a computer-readable storage media, etc.).

The client device 16 may further comprise a local cache 38 that is accessible to the processing unit 20. The local cache 38 may be a section of memory 30 configured to locally store copies of data received, for example, from the server 12.

With reference to FIG. 3, the interactive form 40 allows a user to enter data at the client device 16 and then to communicate the entered data over the network 14 to the server 12 for processing. The interactive form 40 may include a variety of different user interface elements and, in particular, user interface elements in the form of controls 42, 43, 44, 45, 46 that facilitate user input of content, such as control values. Additional controls (not shown) may appear as interface elements of the interactive form 40. The data entered into the interactive form 40 may be related to travel, such as a travel search query for the purpose of travel booking as described in the representative embodiment. However, other types of travel-related applications, such as itinerary management, flight status, etc., that are also heavily dependent on interactive forms and interactive form flows may benefit from the embodiments of the invention.

The controls 42, 43, 44, 45, 46 may include, but are not limited to, a text box, a button, a slider, a spinner, a list box, a drop-down list, and a combo box. Each control may include one or more labels or captions that provide textual context to the subject matter that can be input as a value for the control. The controls 42, 43, 44, 45, 46 on the interactive form 40 function as an input template for new data comprising user-entered values, and can display data supplied to the interactive form 40 from, for example, control values supplied from the server 12.

A text box is associated with an editable text input field and allows the user to input of one or more lines or strings of text as values into the interactive form 40. A user can enter text using a keyboard, navigate and select portions of text using the keyboard, mouse, or touch screen, and edit previously-entered text. A button is a control that can be clicked upon to perform an action. Representative buttons include, but are not limited, to a check box that can be clicked upon to select or deselect (i.e., toggle) an option, a set of radio button that can be clicked upon to select an option from a selection of options from which only one option can be selected at once, and a split button that combines the functionality of a button, typically invoking some default action, with a drop-down list prompting related, secondary actions.

A slider has an indicator that can be moved vertically or horizontally to select a value for an item or, if two indicators are present, comprises a double slider that permits selection of a range of values for an item. A spinner is a value input control with arrow-up and arrow-down buttons that permit a user to step through a range of values.

A list box allows the user to select one or more items from a list contained within a static, multiple line text box. A drop-down list is similar to a list box in that a list of items is displayed from which a user can select. Unlike a list box, a drop-down list is not permanently expanded to show the items of the list but is instead dynamic. When a drop-down list is inactive, a single item is displayed. When a drop-down list is activated, a list of items is displayed from which the user may select one of the items. After the user selects a new item, the drop-down list reverts to the inactive state and displays the selected value. A combo box is a variation of a drop down list that combines an editable text input field with a list box so that the user can make one or more entries absent from the list of items.

The controls 42, 43, 44, 45, 46 of the interactive form 40 may include travel-specific controls. One type of travel-specific control is an auto-complete-and-select group for locations, such as an origin for a travel search query or a destination for the travel search query, that facilitates selection of a specific location by name or International Air Transport Association (IATA) code. Other travel-specific controls may include, but are not limited to, an infant selector that is used to select a number of infants, a round trip toggle that selects whether or not a trip is a round trip, a date picker that provides a calendar control to allow selection of a date, a start and end date picker that is a calendar control that allows selection of a date range, a time slider that provides a 12-hour or 24-hour time selector, a time range selector in the interactive form 40 of a double slider, a special service request selector that permits a user to enter special preferences for a trip, and a service cabin selector (economy, business class, etc.).

One or more choices for a particular one of the controls 42, 43, 44, 45, 46 may be indicated and/or selected by the user using the display 24 and/or external devices 26 (FIG. 2). For selection, the user may select values for a control by depressing keys on the keyboard or click buttons on a mouse, positioning a cursor by using the keyboard or mouse, touching the screen of the display 54 with a fingertip or an electromechanical input device, speaking to a voice-recognition system, etc.

The interactive form 40 is controlled and enriched through a scripting language, such as JavaScript, to permit dynamic creation and modification of the interactive form 40. In particular, the scripting language functions to influenced the content and visual behavior of the controls 42, 43, 44, 45, 46. As examples, a check-box can be pre-selected, selection options for a drop-down list can be sorted by importance, a date range for a slider can be preset, a text box can be pre-filled with data, the auto-complete options of a text box can be set, etc. The control and enrichment of the interactive form 40 may be provided by a JavaScript library of pre-written JavaScript and a JavaScript interpreter including in the client application 32 (FIG. 2). The JavaScript interpreter interprets JavaScript source code in the JavaScript library and executes the script accordingly. The scripting language builds the interactive form 40 and the user interface elements of the interactive form 40, accepts content input into the controls, pre-validates the data input into the controls and/or prepares the form data to send from the client device 16 to the server 12, and causes content received by the client device 16 from the server 12 to be output to controls 42, 43, 44, 45, 46 that have yet to be filled or otherwise addressed by user input and/or displayed to the user on the interactive form 40.

Client application 32 may further include program code that enables data exchange between the client device 16 and the server 12. In one embodiment, the data exchange may occur in an asynchronous, non-blocking manner using AJAX, Extensible Messaging and Presence Protocol (XMPP), etc. and is initiated by the client device 16. The client application 32 can send data to, and retrieve data from, the server 12 asynchronously and in the background preferably without interfering with the display and behavior of the interactive form 40. Alternatively, push technologies may be used in which requests for data exchange are initiated by the server 12.

Figure 4:
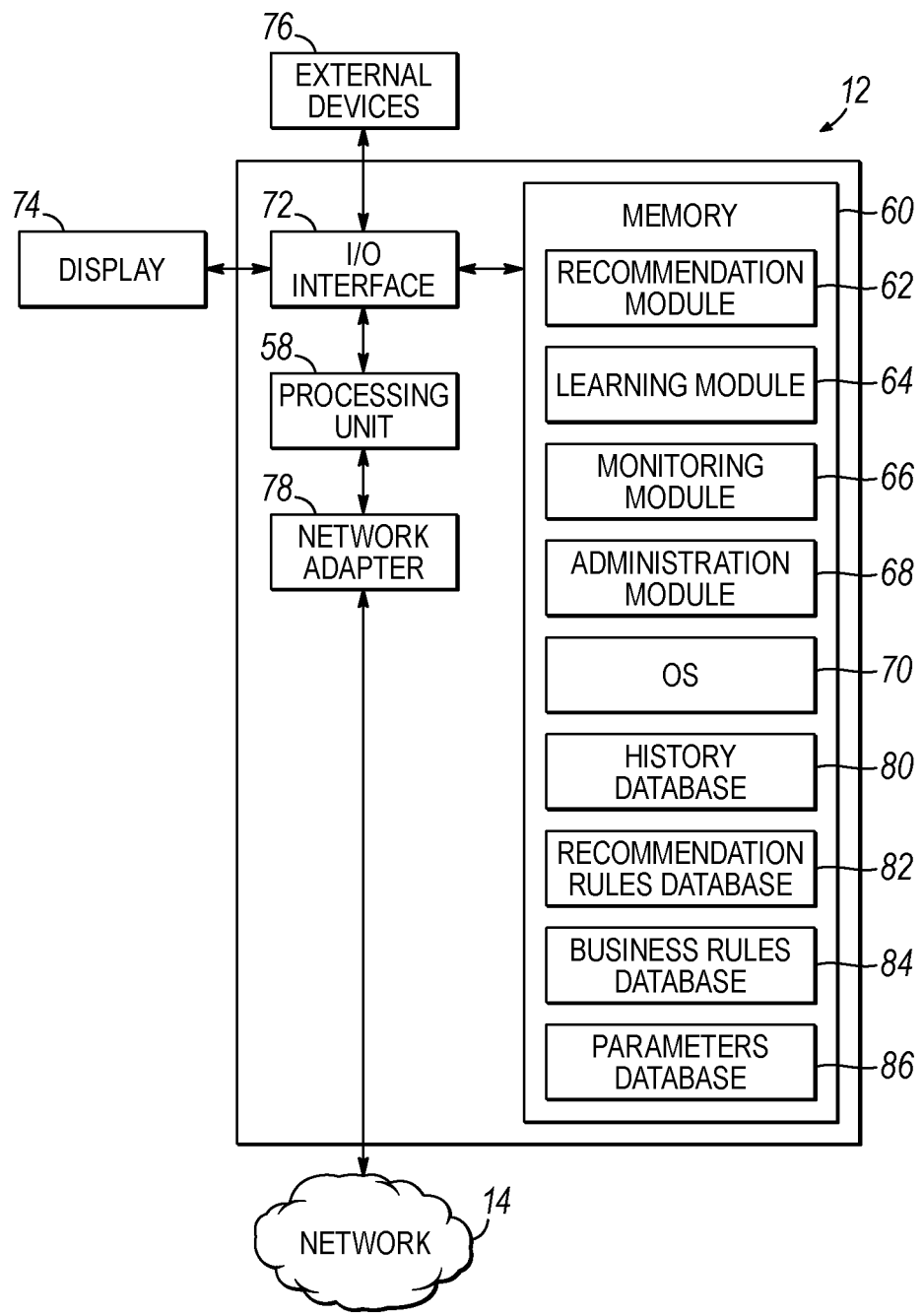
FIG. 4 is a block diagram of the server of FIG. 1.

With reference to FIG. 4 in which like reference numerals refer to like features in FIG. 1, the server 12 includes one or more processing units 58 for executing one or more instructions to perform and/or interact with client device 16 to perform one or more operations consistent with embodiments of the invention. The server 12 includes a memory 60 accessible by the one or more processing units 58. The memory 60 of the server 12 is configured to store software applications or modules 62, 64, 66, 68 and/or an operating system 70, where the modules 62, 64, 66, 68 and operating system 70 each generally comprise one or more instructions stored as program code that may be read from the memory 60 by each processing unit 58. The instructions, when executed by the processing unit 58, may cause each processing unit 58 to perform one or more operations to thereby perform the steps necessary to execute steps, elements, and/or blocks embodying the various embodiments of the invention.

The memory 60 may represent RAM comprising the main storage of a computer, as well as any supplemental levels of memory, e.g., cache memories, non-volatile or backup memories (e.g., programmable or flash memories), mass storage memory, ROM, etc. In addition, the memory 60 may be considered to include memory storage physically located elsewhere, e.g., cache memory in a processing unit of any computing system in communication with the server 12, as well as any storage device on any computing system in communication with the server 12 (e.g., a remote storage database, a memory device of a remote computing device, cloud storage, etc.).

Server 12 further includes an input/output ("I/O") interface 72, a display 74, and external devices 76. The I/O interface 72 of server 12 may be configured to receive data from the display 74 and data from the external devices 76 that is communicated to the processing unit 58 and may be configured to output data from the processing unit 58 to the display 74 and external devices 76. The display 74 and external devices 76 may function to permit a user, such as an administrator, to receive output data from server 12 and/or to supply input data to the server 12. The server 12 may also include a network adapter 78 that supplies the physical connection with the network 14 and that is configured to transmit data to the client device 16 and/or receive data from the client device 16 over the network 14. The network adapter 78 may be a hardwired link such as an IEEE 802.3 (Ethernet) link, a wireless link using a wireless network protocol such as an 802.11 (Wi-Fi) link, or any other suitable link for interfacing the server 12 with the network 14.

The memory 60 also includes a history database 80, a recommendation rules database 82, a business rules database 84, and a parameters database 86. Each of the databases 80, 82, 84, 86 contains data and supporting data structures storing and organizing the data. In particular, each of the databases 80, 82, 84, 86 represents a structured collection of data that may be arranged with any database organization and/or structure, including but not limited to a relational database, a hierarchical database, a network database, and/or combinations thereof. A database management system in the form of a computer software application executing as instructions on the processing unit 58 is used to access the information or data stored in records of the databases 80, 82, 84, 86 in response to a query. Each of the databases 80, 82, 84, 86 organizes and stores the corresponding data in a data so that the data can be used efficiently. The organization of the data may support processes requiring the information (e.g., finding a recommendation rule in the recommendation rules database 82.

The recommendation module 62 at the server 12 directly interacts with the client device 16. The recommendation module 62 receives the values that have been entered into the controls 42, 43, 44, 45, 46 of the interactive form 40 or selected by the user in the controls 42, 43, 44, 45, 46 of the interactive form 40. The recommendation module 62 stores all user-selected values received from the interactive form 40 in the history database 80. In parallel with the storage process, the received values are also used to feed a probabilistic reasoning process based on partial user entry that invokes a set of recommendation rules stored in the recommendation rules database 82. In response to a partial travel search query, the recommendation module 62 queries the recommendation rules database 82 and receives one or more recommendation rules that are appropriate to the context of the query. The query may be constructed using a query language, such as Structured Query Language (SQL).

The recommendation module 62 applies the recommendation rules to determine predicted values for unfilled controls in the interactive form 40 from a known set of values for filled form controls. For example, a plurality of known values for multiple controls may lead to a recommendation for one or more unfilled controls having a statistical correlation and, preferably, a recommendation for one or more values for each of several controls that have a statistical correlation in the form of probabilistic dependencies. Each recommended value of a recommendation may be communicated from the server 12 to the client device 16.

The client application 32 at the client device 16 may use a recommended value received from the server 12 to pre-fill or pre-populate one of the controls prior to any user entries into the control, to order values to be suggested to the user in a control, to make other adaptations to the interactive form 40 (e.g., mask options in a control), etc. The result is that, based upon a known set of one or more filled controls in the interactive form 40, at least one recommendation rule embodying a value or a likely values of one or more unfilled controls in the interactive form 40 is applied by the recommendation module 62 for the function of populating unfilled controls in the interactive form 40 and thereby facilitates a simplified entry of the travel search query by the user of the client device 16.

The recommendations made by the recommendation module 62 may also consider personal historical data of the user at the client device 16. For example, the identity of the user may be known (i.e., a registered user) and the recommendation module 62 may have access to the user's personal history data regarding past recommendations. The user may be a registered user for whom preferences of values for controls are stored and thereby known as personal history data. User preferences for a control derived from the personal history data may be considered in conjunction with the control values derived from the recommendation rules.

The recommendations made by the recommendation module 62 may also consider information relating to the context of the client device 16. For example, the client device 16 may communicate device-dependent information, such as location, as data to the server 12 for use in making recommendations. The client device 16 may also communicate other types of device-independent information comprising data that can be found and/or computed on the client device 16, such as time of day, day of the week, etc. These types of information may also be considered by the recommendation module 62 when making recommendations.

The learning module 64 is configured to input data from a plurality of data sources and to train a predictive algorithm used to generate recommendation rules as predictions related to the data. In particular, the learning module 64 generates recommendation rules between controls of the interactive form 40 that are interrelated (i.e., mutually related). The predictive algorithm is based upon an assumption that some or all of the controls of the interactive form 40 are statistically correlated, perhaps as correlated pairs of controls or as correlated groups of controls, such that entry of values into one or more controls influences the predicted values for more or more other controls. One or more controls may be statistically correlated with one or more other controls to provide the interrelationships that are the basis of the recommendation rules and applied by the predictive algorithm to compute the recommendation rules. For example, multiple controls may be statistically correlated with multiple other controls to provide an interrelationship.

The learning module 64 supplies the recommendation rules to the recommendation rules database 82, which serves as a repository to store the recommendation rules. The execution of learning module 64 is decoupled from the execution of the recommendation module 62. For example, the learning module 64 may asynchronously run in regular cycles (e.g., once per hour) and without triggering by user interactions. In particular, learning module 64 may determine recommendation rules independent of any type of triggering by user interactions at the client device 16.

One data source feeding the learning module 64 is the history database 80, which contains historical collaborative data accumulated from users that is accessible to both of the modules 62, 64. The history database 80 may store data as raw data or aggregated data. The recommendation module 62 writes data representing the selections of all users of the interactive form 40 to the history database 80. The history database 80 may be updated in real time as user selections are received from the client device 16 and all data instances, whether raw data or aggregated data, are refreshed in an incremental manner.

The learning module 64 reads the collaborative historical data of form selections from the history database 80 for use in generating recommendation rules. The input data from the history database 80 represents instances of possible relations between observed user selections, and the recommendation module 62 captures characteristics of interest of the unknown underlying probability distribution of the data in the history database 80.

The history database 80 may also include personal historical data of form selections that is correlated with each particular user of the interactive form 40 at the client device 16. The recommendation module 62 may read this personal historical data from the history database 80 for use in generating a recommendation in conjunction with the recommendation derived from the application of recommendation rules from the recommendation rules database 82.

If the collaborative historical data is stored in the history database 80 as raw data, the learning module 64 will have access to all collaborative historical data without limitation so that the predictive algorithm can detect changes in the patterns of user selection. For example, a parameter relating to a user selection that is currently not important or discriminating may become important or discriminating in the future and, therefore, the raw data is needed so that the learning module 64 can adapt to the change. To accommodate the large number of records, the raw data must be organized in an intelligent manner, such as avoiding data repetitions and storing counts rather than individual records whenever possible without losing granularity.

If the collaborative historical data is aggregated and stored as aggregated data in the history database 80, the learning module 64 is able to process the data more quickly than if in raw form. Storing data in an aggregated format eliminates the need to aggregate data each time that the learning module 64 is run.

Other data sources may be accessed by the learning module 64 during the process of determining the recommendation rules. For example, one such data source may be the business rules database 84, which contains predefined business rules. For example, a representative business rule may be that a majority of leisure trips include a Saturday night stay. Yet another data source that may be accessed by the learning module 64 is the parameters database 86, which contains static parameters. For example, a representative static parameter is an instruction to ignore a certain value for a control of the interactive form 40.

The learning module 64 may use one or more predictive algorithms to compute the recommendation rules for the recommendation rules database 82 based upon probabilistic tendencies of travelers. Generally, the recommendation rules will predict control values that track values for the controls selected by the largest proportion of users. The recommendation rules may be computed using the collaborative historical data in the history database 80. Representative predictive algorithms may be based upon, for example, collaborative filtering or a neural network. After a certain training period, the output of the algorithm is a predictor that defines recommendation rules, which can be used by the recommendation module 62 to propose values for controls based on existing user entries in the partially-filled interactive form 40. The historical collaborative data from the history database 80 may be provided as an initial training set to the algorithm.

Collaborative filtering provides a representative embodiment of unsupervised learning and, generally, filters large amounts of information using algorithms that process data from multiple data sources. Collaborative filtering establishes correlations between selected values for different variables in the controls of the form (e.g., between pairs of selected values) and generates recommendations for the recommendation rules on at least this basis. Collaborative filtering derives the past behavior of travelers (i.e., form selections) from the collaborative history data in the history database 80 and uses that collaborative history data to predict the selections that a traveler might select if given the opportunity. The predictions are filtered using business logic from the business rules database 84 and parameters database 86. In this manner, the learning module 64 may use collaborative filtering to build an item-by-item matrix in the recommendation rules database 82 that specifies relationships between values that can potentially appear as use selections in the files of the controls of interactive form 40.

A neural network provides a representative embodiment of supervised learning and generally is represented by a mathematical model or computational model used to find patterns in the collaborative history data in the history database 80. The neural network is adaptive system in that its structure can change based on the historical traveler data supplied during a learning phase. Based upon the collaborative history data received from the history database 80, the neural network may compute a model from a set of allowed models that minimizes a given cost criterion.

The learning module 64 also features one or more aggregation algorithms that determine an optimal level of aggregation for values of form controls associated with the collaborative historical data in the history database 80. Aggregation may be performed on any set of values for one or more form controls and their associations, and are usually specific to travel, e.g., origin, destination, departure date, return date, airline, etc. The aggregation algorithm makes decisions of whether to aggregate control values based, as examples, on the size of the data set that is available and/or whether a particular control is or is not discriminating.

One factor used in the decision to aggregate data for defining a recommendation rule is the size of the data set for the values of controls stored in the history database 80. Contingent upon the data set size, the aggregation algorithm may decide to aggregate control values according to increasingly coarse granularity in order to improve statistical significance of the recommendations. For example, values for an origin to a particular destination may be aggregated according to a major commercial airport as the origin, a geographical region including multiple major commercial airports confined to a region of a single country as the origin, or an even larger geographical region such as all major commercial airports in a single country as the origin. As a particular example, the historical data supplied to the aggregation algorithm for Nice-to-London trips may be too scarce to obtain a statistically significant prediction. In that eventuality, the aggregation algorithm may decide to aggregate the data for all France-to-London trips, which has coarser granularity and higher statistical significance, as representative of one or more recommendation rules for the Nice-to-London trip.

The aggregations are determined for each set of control values in the history database 80. In the particular example, the coarser aggregation is specific to Nice as an origin in the recommendation rules for Nice-to-London trips supplied to the recommendation rules database 82. However, the fact that Nice-to-London recommendations are determined based on France-to-London data does not mean that the aggregation algorithm will decide to base the recommendations for any other airport in France as an origin for travel to London upon an aggregation of France-to-London data. For example, the history database 80 may hold sufficient data for Paris-to-London itineraries so that the aggregation algorithm may decide that an aggregation is not needed for that particular pair of origin and destinations.

The aggregation algorithm may decide that multiple aggregations are needed. For example, the data in history database 80 for a Nice-to-Salt Lake City itinerary may be too small to be considered by the aggregation algorithm to be statistically significant, as well as the data in history database 80 for travel from all major commercial airports in the larger geographical unit, the nation France, to Salt Lake City. In this instance, the aggregation algorithm may decide to perform aggregation at a higher level, such as aggregating the data for travel from all major commercial airports in France to all major commercial airports in the western United States for use in determining the recommendation rules for travel from Nice to Salt Lake City.

One factor used in the decision to aggregate data for defining a recommendation rule is that certain form controls may be considered to be discriminating. For example, if the choice of airline does not strongly depend on the duration of stay for a given pair of origin and destinations, then the duration of stay is not a discriminating form control considered by the aggregation algorithm for the determination of recommendations of the airline. Accordingly, the duration of stay may be disregarded and data records for various stay durations may be aggregated.

When computing the recommendation rules, the learning module 64 also utilizes business rules contained in the records of the business rules database 84 and static parameters in the parameters database 86. The business rules and static parameters introduce expert judgment into the process defining the recommendation rules. However, the learning module 64 is designed in such a way that, even with no configuration, relevant recommendation rules are determined based on data from existing user traffic.

An example of a recommendation rule may be based upon a distribution of stay durations among the pool of users for France-to-London trips having an outbound leg on a Friday. The recommendation rule may specify that the most probably stay duration is two days, the second most probable stay duration is three days, the third most probable stay duration is seven days, etc. If the partial travel search query received at the server 12 is for travel from France to London departing on a Friday of a given week, then the recommendation module 62 would invoke the recommendation rule to determine the most probable return dates. The recommendation module 62 would then cause the server 12 to communicate at least one of the return dates to the client device 16 for presentation to the user. For example, a single return date that is most probable may be communicated to the client device 16 for populating a control in the interactive form 40 that is a test box or multiple returns dates may communicated to the client device 16 for populating a control in the interactive form 40 that is a list box to present the user with a list that may be ranked according to probability.

The monitoring module 66 may be configured to compare recommendations supplied to the client device 16 based upon the recommendation rules with the actual selections of users. The comparisons made by the monitoring module 66 may be used by, for example, administration module 68.

The administration module 68 may be configured to provide an administrative console that allows an administrator to observe the functioning of the system and the recommendation process. Based on this analysis, the administrator can modify or otherwise alter the business rules in the business rules database 84 and/or the static parameters in the parameters database 86 via the administration module 68 to influence the learning process of the learning module 64 and thereby the recommendation rules in the recommendation rules database. Alternatively, the administrator can define business rules for the business rules database 84 and/or static parameters for the parameters database 86 via the administration module 68. The administration module 68 may also manually or automatically trigger the running of the learning module 64 with a given frequency. The administration module 68 may, for example, detect discrepancies, or track failures and weaknesses of the existing recommendation process.

In an alternative embodiment of the invention, the data held in the local cache 38 (FIG. 2) of client device 16 may include one or more recommendations received from the server 12. The local cache 38 may temporarily hold the recommendations for use in populating one or more of the controls 42, 43, 44, 45, 46 in the interactive form 40 (FIG. 3) based upon entry of only a portion of a complete travel search query. For example, the local cache 38 may store a number (e.g., three) of the most popular destinations as recommendations for itineraries originating at each of a number of origins as constrained by a physical size of the storage space. Having some or all of the recommendations at the client device 16 may speed the recommendation process. Selections made in the interactive form 40 at the client device 16 may still be communicated over the network 14 to the server 12, particularly upon the actual input of a less popular selection. The recommendation module 62 at the server 12 may also cause additional recommendations for the same control or for a different control to be sent to the client device 16 for presentation to the user and/or may store user selections in the history database 80 as described herein.

In alternative embodiments of the invention, client application 32 at the client device 16 may include the entire algorithm for the recommendation module 62 or, at the least, a portion of the algorithm of the recommendation module 62. The local recommendation can rely on values entered into the form controls by the user and held in the local cache 38 to provide recommendations (e.g., the three most popular destinations based upon the user history in the local cache 38. The proportion of the algorithm executed at the client device 16 may be contingent on the processing power, memory, etc. of the client device 16. Placing all or part of the recommendation algorithm at the client device may speed the recommendation process. Despite the presence of all or part of the recommendation algorithm at the client device 16, the server 12 may still push recommended values to the client device 16. In this manner, a limited number of recommended control values may be made available at the client device 16 from the local cache 38 while awaiting the arrival of additional recommended control values, possible for the same control, from the server 12.

In another alternative embodiment of the invention, the local cache 38 (FIG. 2) of client device 16 may be used to temporarily store values entered by the user of the client device 16 as a local history. The client device 16 may transmit the contents of the local history in the local cache 38 over the network 14 to the server 12 so that the server 12 can update the history database 80. For example, the client device 16 may dump the contents of the local history to the server 12 at a time of day when traffic over the network 14 is relatively light. As another example, if the client device 16 is a mobile device, the local history may be communicated from the client device 16 to the server 12 upon initial connection with the network 14.

Figure 5:
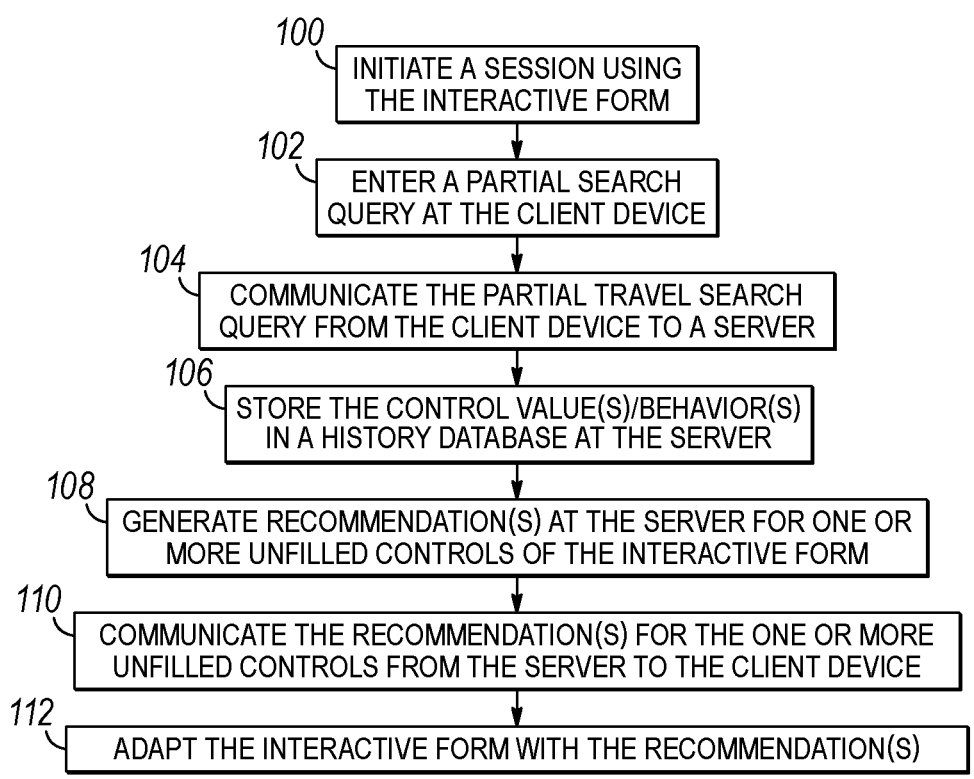
FIG. 5 is a flow chart illustrating the recommendation process.

With reference to FIG. 5, the receipt and processing of form data in conjunction with the provision of recommendations will be described. A user navigates to a website (e.g., a travel agency web site) in the browser or opens a mobile app at the client device 16, connects with the network 14, and initiates a session for communicating over the network 14 with the server 12 using the interactive form 40 (block 100). In the representative embodiment, the user initiates entry of a travel search query using the interactive form 40. However, in advance of any user entry, one or more of the controls of the interactive form 40 may be pre-filled with a recommended value. To initiate the pre-filling, one or more recommendations may be retrieved from the local cache 38 at the client device and used to provide the pre-filling.

The user may populate each of one or more of the controls in the interactive form 40 at the client device 16, but not all of the controls of the interactive form 40, with a value to partially enter a travel search query (block 102). The client application 32 detects the entry of the partial travel search query into the interactive form 40 and causes the processing unit 20 to process the values entered into the implicated controls. The client application 32 running on the processor 20 at the client device 16 causes the client device 16 to communicate at least one entered value or at least one entered behavior, and preferably all entered values and behaviors, as data over the network 14 to the server 12 (block 104). The client device 16 may also communicate information relating to the context of the client device 16 (location, time of day, etc.) to the server 12 for use in the recommendation process.

The recommendation module 62 receives the communicated data and stores the values received from the client device in the history database 80 (block 106). The recommendation module 62 subjects the received values to an intelligent, reasoning process that invokes a set of recommendation rules to predict one or more recommendations for one or more of the unfilled controls in the interactive form 40 (block 108). Device-independent information (e.g., location) and device-dependent information (e.g., time of the day or day of the week) computed by or found at the client device 16 and communicated to the server 12 may also be used by the recommendation module 62 in the computation of the recommendations. Each recommendation may comprise one or more recommended values for one or more of the unfilled controls in the interactive form 40. The process flow may be repeated as appropriate as additional values are entered into the controls of the interactive form 40. Preferably, the population of multiple controls of the interactive form 40, after all values are entered in block 104, is capable of influencing at least one other control of the interactive form 40 with a recommendation determined in block 108.

For example, after the session is initiated by the user at the client device 16 for the interactive interchange of information with the server 12, the client application 32 running on the processor 20 at the client device 16 may retrieve recommendations for populating one or both of controls 42, 43 in the interactive form 40 with origin and destinations for a trip booking. In one embodiment, the processor 20 may retrieve the recommendations from the local cache 38 and present those recommendations in controls 42, 43. Alternatively, the client device 16 may communicate the session initiation to the server 12 and the recommendation module 62 running on the processor at the server 12 may cause recommendations for controls 42, 43 to be determined using the recommendation rules in the recommendation rules database 82 and communicated from the server 12 back to the client device 16. Regardless of source, the client application 32 may cause controls 42, 43 in the interactive form 40 to be populated with the recommendations and other values appropriate for the context of control 42, 43 with the values optionally sorted to present the recommended value(s) more highly ranked.

As another example, after the session is initiated by the user at the client device 16 to interactively interchange information with the server 12, the user may populate the control 42 in the interactive form 40 with a text string as an entry representing an origin for a trip booking. The application 32 running on the processor 20 at the client device 16 may retrieve a recommendation from the local cache for populating control 43 in the interactive form 40 with one or more destinations for a trip booking. Alternatively, the client device 16 may communicate the origin to the server 12 and the recommendation module 62 running on the processor at the server 12 may cause a recommendation for control 43 to be determined using the recommendation rules in the recommendation rules database 82 and communicated from the server 12 back to the client device 16. The recommendation received at the client device 16 from the server 12 may be a text string with one recommended value for a destination that is most probable given the origin, or multiple recommended values for a destination (i.e., multiple recommended destinations) that are the most probable given the origin. Control 43 may be populated with the recommendation and optionally other values appropriate for the context of control 43 with the values optionally sorted to present the recommended value(s) more highly ranked in the listing. The user can select the recommended value or one of the recommended values without manual entry into the control 43 and without scrolling through a list of values.

As another example, after a session is initiated at the client device 16, the user may populate controls 42, 43 with text strings respectively representing an origin and a destination, and may populate control 44 with a departure date. The application 32 running on the processor 20 at the client device 16 may populate control 45 in the interactive form 40 with a recommendation for a return date. The processor 20 may retrieve the recommendation from the local cache 38 at the client device 16. Alternatively, the client device 16 may communicate the values for controls 42, 43, 44 entered by the user to the server 12 and the recommendation module 62 running on the processor at the server 12 may cause a recommendation for control 45 to be determined using the recommendation rules in the recommendation rules database 82 and communicated back to the client device 16. The date value of the recommendation may represent a most probable return date given the origin, the destination, and the departure date based upon historical values of user entries used to build the recommendation rules in the recommendation rules database 82. The user can be relieved of the task of selecting the return date and may proceed directly to the next step of the booking process. Even if the return date is not selected, the process of modifying the return date in the control 45 may be simplified if the predicted return date is closer on the calendar to the actual return date than, for example, the current date.

Recommended values based upon the recommendation rules may optionally be combined with or adjusted by recommended values from personal historical data in the history database 80 of the contemporaneous user that entered the partial travel search query at the client device 16. One approach for making the combination is a weighted average of each recommended value based upon all users of the interactive form 40 and the personal recommended value for the contemporaneous user of the client device 16.

One or more recommendations for each implicated control of the interactive form 40 is communicated from the server 12 back to the client device 16 (block 110). Upon receipt, the client application 32 at the client device 16 adapts the interactive form 40 based upon each recommendation (block 112). The client application 32 may populate a particular implicated control in the interactive form 40 with one or more recommended values received from the server 12 or may populate a particular implicated control in the interactive form 40 with one or more recommended values and other values that are not recommended. The client application 32 may also change the state of a particular implicated control in the interactive form 40 to reflect a recommended value.

The user of the interactive form 40 at the client device 16 may adopt or select a recommended value appearing in each adapted control. Alternatively, the user can enter a non-recommended value for one of the adapted controls and, therefore, may select a value not among the recommendations. For example, the user may select one recommended value (e.g., a destination) from among multiple recommended values (e.g., destinations) populating an adapted control. The recommendation, even if not selected by the user, may also aid the user of the client device in making a selection for one or more controls. As an example, the recommended value may be a date differing from the current date that is placed in a date picker and allows selection of a date on a calendar. Even if the recommended value is not selected, the user of the client device 16 may select a date using the date selector that is closer in time to the recommended date than the current date, which may ease the selection process.

The complete travel search query may be used to perform a search to be conducted for trips satisfying the values entered into the interactive form 40. The results may be communicated to the client device 16 and displayed on the client device 16 to the user for evaluation and potentially booking one of the trips.

Figure 6:
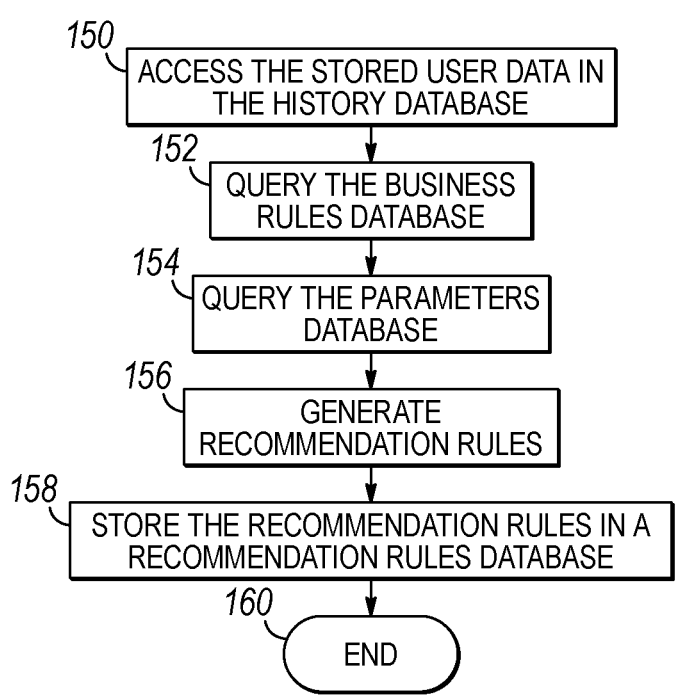
FIG. 6 is a flow chart illustrating a learning process at the server that prepares recommendation rules for use in the recommendation process.

With reference to FIG. 6, the processing of form data stored in the history database 80 to generate recommendation rules for the recommendation rules database will be described. The learning module 64 accesses the stored user data in the history database 80 that chronicles selections made in the various controls of interactive form 40 by a pool of all client device users (block 150). The learning module 64 may query the business rules database to receive business rules that pertain to the recommendation process (block 152). The learning module 64 may query the parameters database to receive static parameters that pertain to the recommendation process (block 154). The one or more predictive algorithms of learning module 64 analyze the historical user data in conjunction with the information from the business rules database and the parameters database to generate recommendation rules (block 156). The recommendation process may be based on the behavior of users when filling the controls of the interactive form 40 and may be independent of human expert judgment. However, human expert judgment may be used to influence recommendations through business rules and static parameters. The historical user data may be aggregated, as discussed hereinabove, for defining a recommendation rule is the size of the data set for the values of controls stored in the history database 80. Contingent upon the data set size, the aggregation algorithm may decide to aggregate control values according to increasingly coarse granularity in order to improve statistical significance of the recommendations. The learning module 64 supplies these recommendation rules to the recommendation rules database 82 for storage (block 158). The routine then ends (block 160). As described hereinabove, the recommendation module 62 accesses the recommendation rules to the recommendation rules database 82 in order to propose values for the controls at the interactive form 40 during future sessions of a user at the client device 16 based on partial user entries.

The routines and/or instructions that may be executed by the one or more processing units of the server 12 and client device 16 to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the embodiments of the invention may be used in conjunction with other travel-related applications aside from travel booking and travel search queries, such as itinerary management, flight status, etc., that are also heavily dependent on interactive forms and interactive form flows. The invention in its broader aspects is therefore not limited to the specific details, representative methods, and illustrative examples shown and described. Accordingly, departures may be made from such details without departing from the spirit or scope of applicants' general inventive concept.

What is claimed is:

1. A method comprising:
   receiving at a server a plurality of values for a plurality of controls of an interactive form, each value comprising a portion of a travel-related search query entered into one of the controls of the interactive form by each of a plurality of users;
   determining with the server a plurality of recommendation rules based upon the values for interrelated controls, each recommendation rule logically connecting two or more of the interrelated controls;

computing the plurality of recommendation rules using collaborative historical data in a history database; and aggregating at least one data set within the collaborative historical data in the history database according to increasing coarse granularity if a size of the data set is below a threshold, wherein aggregation of the at least one data set based on the increasing coarse granularity improves a statistical significance of the plurality of recommendation rules.

2. The method of claim 1 further comprising:

generating at the server at least one recommended value for one of the controls of the interactive form using the recommendation rules; and communicating at least one recommended value from the server to a client device.

3. The method of claim 2 further comprising:

storing the at least one recommended value in a local cache at the client device.

4. The method of claim 1 further comprising:

communicating at least one of the recommendation rules from the server to a client device; and generating at least one recommended value for one of the controls at the client device using the at least one of the recommendation rules.

5. The method of claim 1 wherein each travel-search query is received from a client device, and the recommendation rules are asynchronously determined in relation to a receipt time of each travel-search query.

6. The method of claim 1 further comprising:

storing the values received at the server in a database, wherein the server reads the values from the database to determine the recommendation rules.

7. The method of claim 6 wherein the values are stored as aggregated data for a plurality of overlapping geographic regions of different sizes.

8. The method of claim 1 wherein determining with the server the recommendation rules based upon the values for controls comprises:

applying a plurality of predefined business rules and a plurality of static parameters at the server to determine the recommendation rules.

9. The method of claim 1 wherein determining with the server the recommendation rules based upon the values for controls comprises:

applying a predictive algorithm to compute the recommendation rules based upon probabilistic relationships between the values for the controls.

10. A computer program product comprising:

a computer readable storage medium; and program code stored on the computer readable medium and configured to, upon execution by at least one processor, determine a plurality of recommendation rules by:

receive at a server a plurality of values for a plurality of controls of an interactive form, each value comprising a portion of a travel-related search query entered into one of the controls of the interactive form by each of a plurality of users;

determine with the server the plurality of recommendation rules based upon the values for interrelated controls, each recommendation rule logically connecting two or more of the interrelated controls;

compute the plurality of recommendation rules using collaborative historical data in a history database; and aggregate at least one data set within the collaborative historical data in the history database according to increasing coarse granularity if a size of the data set is below a threshold, wherein aggregation of the at least one data set based on the increasing coarse granularity improves a statistical significance of the plurality of recommendation rules.

11. An apparatus comprising:

a server including a processor; and program code configured to be executed by the processor to interact with an interactive form, the program code configured to cause the processor to receive a plurality of values for a plurality of controls of the interactive form, and determine a plurality of recommendation rules based upon the values for interrelated controls using collaborative historical data in a history database, wherein each value represents a portion of a travel-related search query entered into one of the controls by a plurality of users of the interactive form, and each recommendation rule logically connecting two or more of the interrelated controls, the program code configured to cause the processor to aggregate at least one data set within the collaborative historical data in the history database according to increasing coarse granularity if a size of the data set is below a threshold, wherein aggregation of the at least one data set based on the increasing coarse granularity improves a statistical significance of the plurality of recommendation rules.

12. The apparatus of claim 11 further comprising:

program code configured to cause the processor to generate at least one recommended value for one of the controls of the interactive form using the recommendation rules; and program code configured to cause the processor to communicate at least one recommended value from the server to a client device.

13. The apparatus of claim 11 further comprising:

a recommendation rules database coupled with the processor; and program code configured to cause the processor to store the recommendation rules in the recommendation rules database.

14. The apparatus of claim 11 further comprising:

program code configured to cause the processor to communicate at least one of the recommendation rules from the server to a client device.

15. The apparatus of claim 11 further comprising:

a database coupled with the server, the database configured to store the values received at the server, wherein the server is configured to read the values from the database to determine the recommendation rules.

16. The apparatus of claim 15 wherein the database stores the values as aggregated data for a plurality of overlapping geographic regions of different sizes.

17. The apparatus of claim 11 further comprising:

a first database containing a plurality of predefined business rules; and a second database containing a plurality of static parameters, wherein the processor determines the recommendation rules based upon the predefined business rules in the first database and the static parameters in the second database.

18. The apparatus of claim 11 wherein the program code configured to cause the processor to determine the recommendation rules relating the interrelated controls for the values for interrelated controls comprises:

program code configured to cause the processor to apply a predictive algorithm to compute the recommendation rules based upon probabilistic relationships between the values for the controls.

* * * * *